(12) United States Patent
Eckartsberg et al.

(10) Patent No.: US 8,966,927 B2
(45) Date of Patent: Mar. 3, 2015

(54) OUTPUT UNIT OF A REFRIGERATION DEVICE, REFRIGERATION DEVICE AND METHOD FOR INSTALLING A REFRIGERATION DEVICE

(75) Inventors: Peter Eckartsberg, Aalen (DE); Karl-Friedrich Laible, Langenau (DE); Arno Matzner, Eichenzell (DE); Frank Placke, Bielefeld (DE); Matthias Stahl, Oerlinghausen (DE); Ulrich van Pels, Rheda-Wiedenbruck (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 1145 days.

(21) Appl. No.: 12/809,088

(22) PCT Filed: Dec. 16, 2008

(86) PCT No.: PCT/EP2008/067673
§ 371 (c)(1),
(2), (4) Date: Sep. 8, 2010

(87) PCT Pub. No.: WO2009/080635
PCT Pub. Date: Jul. 2, 2009

(65) Prior Publication Data
US 2011/0023525 A1 Feb. 3, 2011

(30) Foreign Application Priority Data
Dec. 21, 2007 (DE) .................... 10 2007 062 001

(51) Int. Cl.
*F25D 3/00* (2006.01)
*F25D 23/12* (2006.01)
(Continued)

(52) U.S. Cl.
CPC ............... *F25D 23/126* (2013.01); *F25D 3/00* (2013.01); *F16B 5/025* (2013.01); *F16B 5/0208* (2013.01); *F25D 31/002* (2013.01)
USPC ........................................................ 62/389

(58) Field of Classification Search
CPC ............... F25D 31/002; F25D 23/126; B67D 2210/00036; B67D 2210/00031; B67D 2210/00041; F16B 2/00; F16B 2/04; F16B 2/065; F16B 2/14; F16B 2/18; F16B 2/185; F16B 2/20; F16B 2/24; F16B 2/241; F16B 2/243; F16B 2/246; F16B 5/0208; F16B 5/025; F16B 37/068; F16B 39/284; F16B 39/34
USPC ......... 62/389, 377, 331, 391; 312/401, 265.5, 312/265.6; 222/504, 108, 111, 182, 183, 222/180, 180.1
See application file for complete search history.

(56) References Cited

U.S. PATENT DOCUMENTS
2,274,409 A 2/1942 Harbison
3,700,292 A * 10/1972 Owens ............................. 384/9
(Continued)

FOREIGN PATENT DOCUMENTS
DE 102006018204 * 10/2007
DE 102006018204 A1 * 10/2007
(Continued)

OTHER PUBLICATIONS
Granting Decision RU 2010129210/13, Oct. 26, 2012.

*Primary Examiner* — Frantz Jules
*Assistant Examiner* — Brian King
(74) *Attorney, Agent, or Firm* — Nixon & Vanderhye, P.C.

(57) ABSTRACT

An output unit of a refrigeration device having a niche with a rear wall, which is provided with a cover, and a method of installing the output unit. The cover includes a dish-shaped section, which is curved inward into the niche and bounded by opposite edge sections, which are connected with a niche frame. In an exemplary embodiment of the invention, the edge sections at front supporting surfaces of the niche frame are held in contact in an installation end position, wherein the dish-shaped section is pulled by fastening means against the rear wall of the niche. By these means, it is ensured that the narrowest or most uniform gap possible between the cover and the place of installation is guaranteed and, in addition, fastening means are not visible to the user.

32 Claims, 9 Drawing Sheets

(51) Int. Cl.
*F16B 5/02* (2006.01)
*F25D 31/00* (2006.01)

(56) References Cited

U.S. PATENT DOCUMENTS

| | | | |
|---|---|---|---|
| 5,442,933 A * | 8/1995 | Unger | 62/275 |
| 7,007,500 B2 | 3/2006 | Lee | |
| 7,340,915 B2 | 3/2008 | Kwon | |
| 7,455,085 B2 | 11/2008 | Voglewede et al. | |
| 7,921,668 B2 | 4/2011 | Lee et al. | |
| 8,113,248 B2 * | 2/2012 | Lee et al. | 141/358 |
| 2003/0196447 A1 * | 10/2003 | Lee et al. | 62/389 |
| 2005/0268638 A1 * | 12/2005 | Voglewede et al. | 62/389 |
| 2006/0086130 A1 | 4/2006 | Anselmino et al. | |
| 2006/0144075 A1 | 7/2006 | Bowen et al. | |
| 2008/0190132 A1 | 8/2008 | Voglewede et al. | |

FOREIGN PATENT DOCUMENTS

| | | | |
|---|---|---|---|
| DE | 1002006018204 A1 * | 10/2007 | |
| JP | 2006327593 A | 12/2006 | |
| KR | 10-2005-0077581 A | 8/2005 | |

* cited by examiner

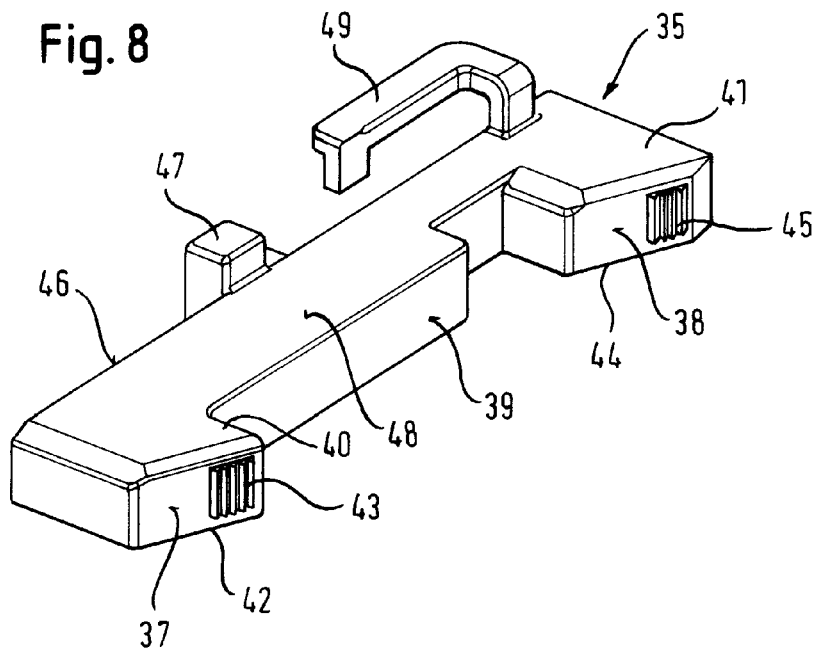
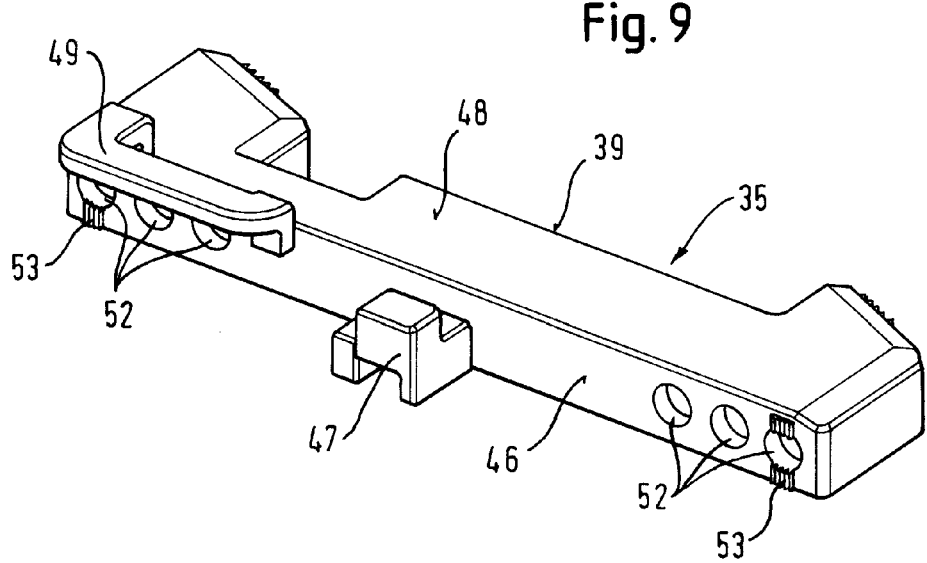

OUTPUT UNIT OF A REFRIGERATION DEVICE, REFRIGERATION DEVICE AND METHOD FOR INSTALLING A REFRIGERATION DEVICE

This application is a U.S. National Phase of International Patent Application No. PCT/EP08/67673, filed Dec. 16, 2008, which designates the U.S. and claims priority to German Patent Application No. DE 10 2007 062 001.4, filed Dec. 21, 2007, the entire contents of each of which are hereby incorporated by reference.

BACKGROUND OF THE INVENTION

The present invention relates to an output unit of a refrigeration device, having a niche with a rear wall which is provided with a cover having a dish-shaped section that is curved inwardly into the niche and bounded by opposite edge sections connected by means of a niche frame.

An output unit of a refrigeration device is described in DE 10 2004 013 432 A1. Disclosed therein is a refrigerator door having a dispenser. Said refrigerator door has an outer case defining its outward appearance. Mounted on both side ends of the refrigerator door are a first and second mounting frame that have a first and second mounting slot embodied as being located in said frames mutually opposite in the longitudinal direction. The dispenser is detachably coupled to the front of the outer case and has a housing which defines the dispenser's outward appearance and is provided with a recess section. Except for an area in which the dispenser is installed, an external plate section is coupled to the front of the outer case to define the refrigerator door's outward appearance.

The two side-end sections of the external plate are inserted into the first and second mounting frame's first and second mounting slot. If it is necessary to replace the external plates or the dispenser, the user can simply replace the external plates or dispenser without having to replace the refrigerator door. The color of the dispenser's housing can accordingly be variably selected. That means that the color of the housing can be selected as being identical to that of the external plates or that the color of the housing can be selected as being different from that of the external plates, whatever the user wishes. It is, though, therein necessary for the door to be embodied as being in two parts, meaning that a top external plate and a separate bottom external plate will be necessary. The dispenser's housing, forming the cover, is moreover secured in position in a mounting frame's mounting slots. That means that on the one hand the mounting frame will remain visible even when installation is complete and will detract from the refrigeration device's visual impact; it means on the other hand that the mounting frame will have to be detached for mounting or removing the cover. That requires first removing lateral screws on the mounting frame.

EP 1 605 219 A1 describes an output unit of a refrigeration device with a niche and faceplate embodied as a single piece and not having a separate cover. The niche is positioned in the manner of a faceplate externally onto the output unit using securing means. Owing to the intricate design of the niche-shaped faceplate it is economically impractical to produce it from high-grade materials such as, for instance, high-grade steel. To visually conceal the securing means they need to be covered. The operating tabs of the water dispenser and ice feeder are for that purpose positioned in front of the securing means. The niche and faceplate can consequently be mounted or removed only by extensively dismantling functional components of the output unit.

BRIEF SUMMARY OF THE INVENTION

The object of the invention is to provide a cover for the rear wall of a niche of an output unit of a refrigeration device that can be mounted or removed in a simple manner and, after installation, will be secured in position in a visually pleasing manner. For positional securing that is visually pleasing it should in particular be insured that the gaps between the cover and installation site are as narrow or, as the case may be, even as possible and also that no securing means will be visible to the user.

Said object is achieved by means of an output unit of a refrigeration device having the features of claim 1.

Because the edge sections of the cover are held in a final mounting position applied against front supporting surfaces of the niche frame, and since the dish-shaped section is pulled against the rear wall of the niche by a securing means, the cover's elasticity is utilized for bracing the edge sections against the supporting surfaces with a reduced or, as the case may be, no gap. In the braced condition the edge sections of the cover are applied against the supporting surfaces under a prestressing force. Thanks to utilizing of the cover's elastic properties in combination with the applied prestressing force, manufacturing tolerances of the components, in particular the cover itself, and differences in positioning between the output unit and niche frame can be compensated.

The output unit can be used in particular for a water and ice dispenser of a refrigeration device. The cover of the output unit should for installation reasons therein be embodied as detachable. The cover is inventively able to compensate all major assembly tolerances so that it will lie neatly against its securing edge. The securing edge can be located on a recess in a housing of the refrigeration device, on a separate mounting frame, or on a cut-out in a furniture door. An additional requirement is for the selected securing means by which the cover is secured to the output unit to be arranged such as to be visually concealed from the user. It is particularly insured by the invention that the cover's edge sections are always applied against the respective supporting surfaces free of gaps. That is achieved by utilizing the cover's elastic properties to establish deformation stresses in the cover that produce stress forces pressing the cover's edge sections against the supporting surfaces.

Due to the manufacturing tolerances to be expected for the cover, gap-free mounting can be achieved by enabling the cover, regardless of its specific tolerance-dependent structural size, always to be pressed to the back of the niche, meaning toward the rear wall, sufficiently for the edge sections always to come to rest against the supporting surfaces and for no open gap to remain. Because the cover is embodied as being curved like a dish, the curvature can to a certain extent be deformed so that manufacturing tolerances in the cover will be compensated by the changes in the curvature's shape. A curvature of the cover in the form of, for instance, a circular arc section would change therein to an elliptical arc shape. Even with the cover ideally having an arc shape, it will be possible to realize the inventive deformation also if the niche or, as the case may be, cover exhibits basic shapes that are more box-like.

The cover can be embodied as being detachable and be held in its final mounting position by securing means that can be released. The cover's being detachably held in position will allow the output unit to be accommodated to different furniture doors. Thus it will always be possible to install the cover with an exact fit for furniture doors of different thickness. It will also be possible to use different covers that coordinate with the furniture door's specific visual embodiment. A hitherto employed cover can be replaced with one embodied visually differently if the output unit or, as the case may be, refrigeration device is fitted with a different furniture door.

The cover can be held at a distance from the rear wall of the niche by securing means located in a central region of the cover's dish-shaped section. Through the cover's being secured not applied directly against the rear wall, there will be sufficient play to enable the cover to be prestressed to the necessary extent. As the cover's greatest elastic mobility can be expected in a central section, the securing means should be positioned there so that the cover's maximum possible elastic deformation can be utilized.

A wall section, assigned to the central region of the cover's dish-shaped section, of the niche's rear wall can therein be embodied as being depth-adjustable. The rear wall's depth-adjustability will enable the distance between the output unit's rear wall and the cover to be positioned with sufficient play even when the refrigeration device is positioned differently relative to the furniture door. If, for example in the case of a furniture door that is very thin, the niche's rear wall is displaced so far forward that the cover is applied against the rear wall, no stress will develop in the cover. The depth-adjustability will enable the output unit's niche to be set further back relative to the refrigeration device, as a result of which play will again be created for stressing the cover.

For depth-adjusting, the niche's rear wall can be fixed to a basic body of the output unit via adjustable adjusting wedges. Preferably two adjusting wedges that can be moved toward and away from each other can be provided whose slant interacts with corresponding slanted surfaces on the output unit's basic body or niche. To prevent the adjusting wedges from being accidentally displaced, the slanted contact surfaces can have a toothed profile so that a form-fit engagement will be realized that prevents displacing of the adjusting wedges. Apart from adjusting wedges, screw-based designs offer another option for the purpose of depth-adjusting.

The releasable securing means can have, for example, a screw that is arranged preferably visually concealed for pulling a top region of the cover against the niche's rear wall. The cover's top region is generally one that is not visible to the user and which owing to its withdrawn position in the niche is visually concealed by the niche's ceiling wall. The screw can in particular be provided at a location that is visually concealed by an output chute of the ice maker or an outlet of the water dispenser.

In a further embodiment, the releasable securing means can have a pressure piece embodied for pushing the cover from its concave side toward the niche's rear wall for pulling a bottom region of the cover against the niche's rear wall. The advantage of that is that no screws will be required for pulling the cover against the niche's rear wall. The securing forces will be transmitted by the pressure piece onto the cover, which will consequently be braced against the niche's rear wall.

In this embodiment, a drip pan applied against the pressure piece can be depth-adjustably mounted in the output unit for pushing the pressure piece against the cover. The cover will in a bottom region be pushed backward indirectly by the drip pan against the niche's rear wall. A drip pan required in any event will in this regard be employed as a securing means so that this functionality will not be visually obvious and no separate securing means will be noticed, something that will enhance the device's overall visual impact.

The drip pan itself can be pushed backward by a position-adjusting means. The position-adjusting means can in particular be accessible from a front side of the output unit. The drip pan is mounted capable of moving in the depth direction. Thus the cover's bottom region can be pushed against the rear wall by moving the drip pan backward. So that the drip pan can be fixed in its new position, a tensioning wedge is provided that can be located in its position by a securing element.

The depth-adjustable drip pan can for that purpose be capable of being moved by actuating a movably mounted tensioning wedge for pressing the pressure piece against the cover. The tensioning wedge can be located in its position by a securing element so that the tensioning wedge can be fixed in its intended position to prevent any undesired displacement. Screws, for instance, can be provided as the securing means.

The cover can in any inventive embodiment be made from a metallic strip material, in particular a high-grade steel sheet. Embodying the cover in the form of high-grade steel will produce an especially high-quality appearance, which is why producing the cover from a high-grade steel sheet is desirable. For manufacturing reasons it is, though, difficult to produce high-grade steel sheets that are bowed, meaning curved in the manner of a dish, to within sufficiently narrow tolerances to be able to insure a good visual impact with gaps that are as narrow and even as possible. That is because of the resilient properties of the high-grade steel sheets, for example. However, similar difficulties in being able to manufacture to within narrow tolerances are also to be expected with other materials behaving in the same way. Using a cover made of high-grade steel as an example, what is proposed by the invention is not to manufacture the high-grade steel sheet with sufficient precision but instead to utilize the sheet's elastic properties to apply a prestressing of the cover that will insure gap-free mounting. It is inventively possible to dispense with manufacturing the cover precisely to within narrow tolerances, as a result of which the manufacturing costs will be low. Yet at the same time, securing the cover in an elastically braced manner will reduce the mounting gaps to a minimum, something that will enhance the visual impact of the output unit and of the refrigeration device overall.

The invention relates in particular also to refrigeration devices having a water dispenser or, as the case may be, ice maker with an inventive output unit. The invention relates also to a method for installing an output unit of a refrigeration device on a door, in particular a furniture door.

The inventive method for installing an output unit of a refrigeration device on a door can have the following steps:
  Inserting a dish-shaped cover made in particular of high-grade steel sheet through an opening in the door until a curved section of the cover is positioned in front of a rear wall of a niche in the output unit,
  pulling a top region of the cover against the rear wall of the niche by tightening a releasable securing means,
  inserting a drip pan into the output unit,
  bracing a tensioning wedge for adjusting the depth of the drip pan to push a bottom region of the cover against the niche's rear wall by means of a pressure piece actuated by the drip pan.

The drip pan can alternatively also be inserted into the output unit before the cover's top region is pulled against the niche's rear wall by tightening a releasable securing means.

Before the dish-shaped cover starts being inserted it is optionally possible, if required, to adjust the depth of the output unit relative to the door by repositioning adjusting wedges located between the output unit and refrigeration device.

BRIEF DESCRIPTION OF THE DRAWINGS

An embodiment variant of the invention is described using an output unit of a refrigeration device intended for domestic use, which unit is shown by way of example in the figures. Further, general features and advantages of the present invention will emerge from the detailed description of this specific exemplary embodiment:

FIG. 8 is a perspective front view of the tensioning wedge as shown in FIG. 7;

FIG. 9 is a perspective rear view of the tensioning wedge as shown in FIG. 7;

DETAILED DESCRIPTION OF EXEMPLARY EMBODIMENTS OF THE PRESENT INVENTION

Figure 1:
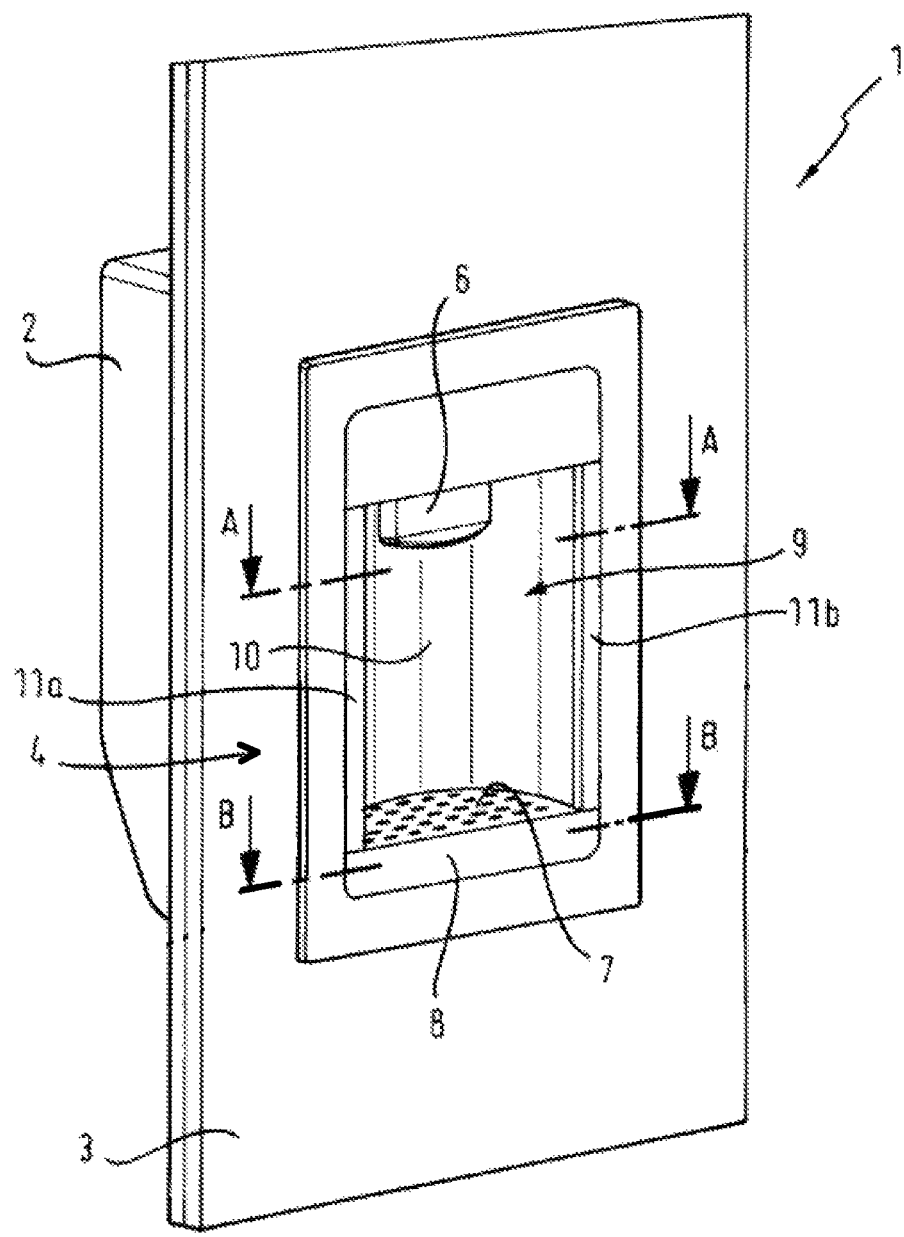
FIG. 1 is a perspective view of an output unit of a refrigeration device intended for domestic use in a furniture door.

An output unit 1 as shown in FIG. 1 has a water dispenser and/or ice maker 2 located on a rear side of a furniture door 3. The furniture door 3 has an opening for a niche 4 of the output unit 1. The niche 4 is bounded by a niche frame 5. Located on a top end of the niche 4 is an output chute 6 for either ice or water. Located on a bottom end of the niche 4 is a colander 7 covering a drip pan 8. A cover 9 in the niche extends between the output chute 6 and drip pan 8. The cover 9 has a dish-shaped section 10 and two opposite edge sections 11a and 11b. The edge section 11a, shown on the left in FIG. 1, is applied against a first front supporting surface 12a of the niche frame 5. The edge section 11b, shown on the right in FIG. 1, is applied against a second front supporting surface 12b of the niche frame 5.

Figure 2:
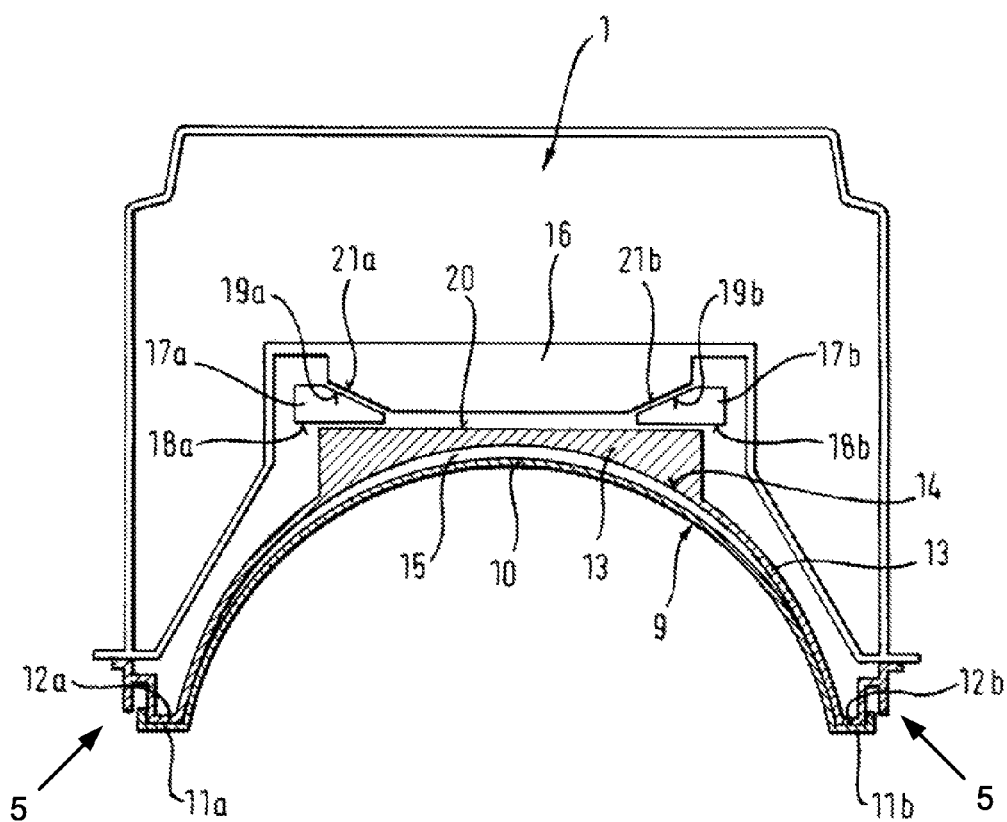
FIG. 2 is a sectional view along the intersection line A-A as shown in FIG. 1.

FIG. 2 is a sectional view through the output unit 1 along the intersection line A-A as shown in FIG. 1 approximately at the level of the output chute 6. The cover 9 is mounted in front of a rear wall 13 of the output unit 1. The rear wall 13 has a central arched section 14 limited by the two opposite front supporting surfaces 12a and 12b. The opposite front supporting surfaces 12a and 12b form a part of the niche frame 5 of the rear wall 13. In the mounting position shown, the edge sections 11a and 11b are applied directly against the front supporting surfaces 12a and 12b without any gaps. The dish-shaped section 10 of the cover 9 is not, though, applied directly against the central arched section 14 of the rear wall 13; instead, even in the correct mounting position there will still be a compensating space 15. The position of the rear wall 13 can be depth-adjusted with respect to a basic body 16 of the output unit 1. Two adjusting wedges 17a and 17b have for that purpose been inserted between the rear wall 13 and basic body 16. The adjusting wedges 17a, 17b both have a level contact surface 18a, 18b and a slanted contact surface 19a, 19b. The level contact surfaces 18a, 18b correspond with a level rear side 20 of the rear wall 13. The two slanted contact surfaces 19a, 19b correspond with slanted surfaces 21a and 21b of the basic body 16. By pushing the two adjusting wedges 17a and 17b toward each other, the rear wall 13 will be displaced further forward toward the niche opening. The rear wall 13 will be moved back by pulling the two adjusting wedges 17a and 17b apart. A sufficiently large compensating space 15 can always be set by means of the adjusting wedges 17a and 17b.

Figure 3:
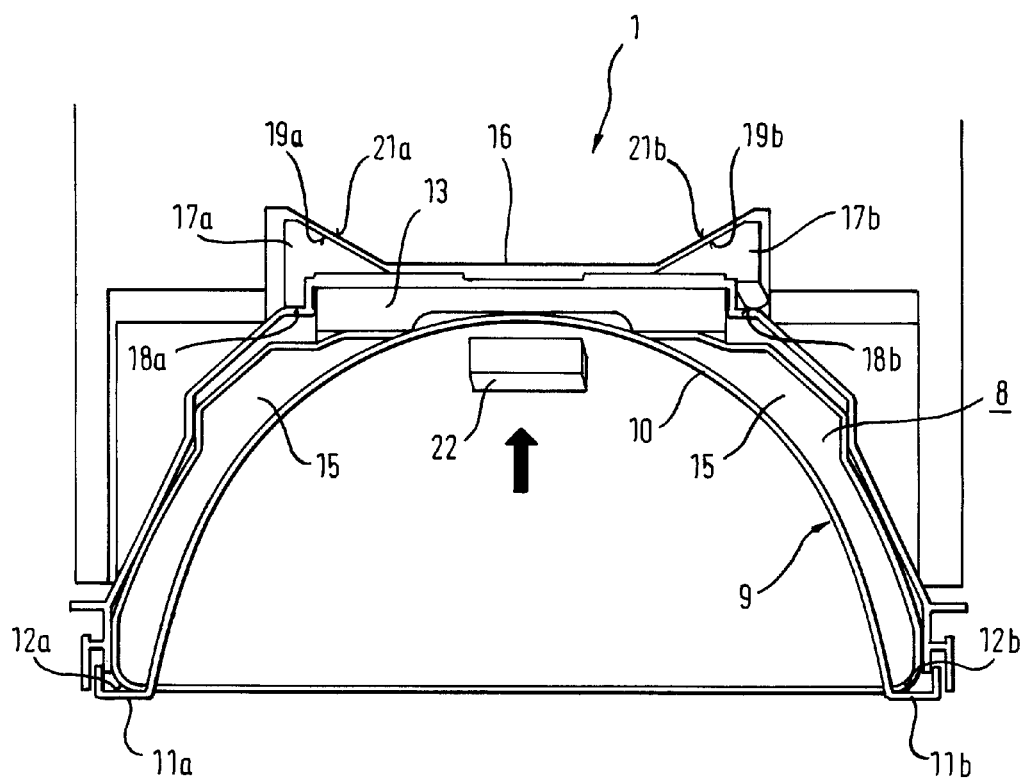
FIG. 3 is a sectional view along the intersection line B-B as shown in FIG. 1.
Figure 4:
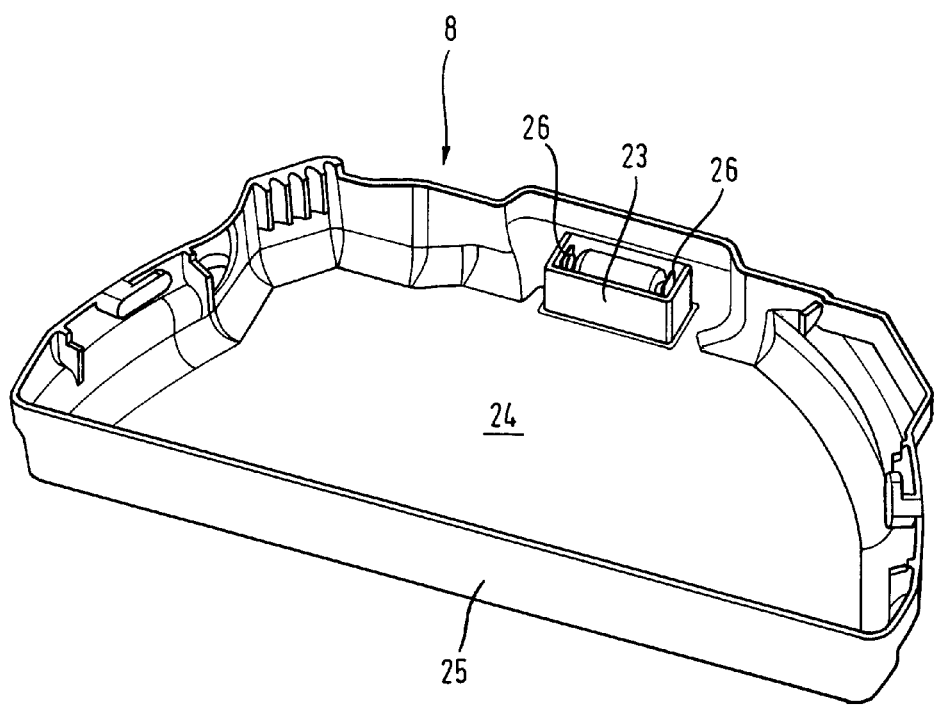
FIG. 4 is a perspective top view onto an inventive drip pan having a pressure-piece receptacle.

FIG. 3 is a sectional view through the output unit 1 along the intersection line B-B as shown in FIG. 1 approximately at the height of the drip pan B. Shown in section above the drip pan 8 is the cover 9. The central dish-shaped section 10 of the cover 9 is pushed against the rear wall 13 by means of a pressure piece 22. The pressure piece 22 is inserted into a pressure-piece receptacle 23 (FIG. 4). The pressure piece 22 is pushed against the concave side of the central dish-shaped section 10 of the cover 9 by moving the drip pan 8 in the direction of the arrow. The pressure piece 22 braces the central dish-shaped section 10 of the cover 9 against the rear wall 13 of the niche 4. The bottom regions of the edge sections 11a and 11b of the cover 9 are thereby pulled against the front supporting surfaces 12a and 12b of the niche frame 5. The position of the rear wall 13 can also in this bottom region be depth-adjusted with respect to the basic body 16 of the output unit 1. Two adjusting wedges 17a and 17b have for that purpose likewise been inserted between the rear wall 13 and basic body 16. The adjusting wedges 17a, 17b both have a level contact surface 18a, 18b and a slanted contact surface 19a, 19b. The level contact surfaces 18a, 18b correspond with a level rear side 20 of the rear wall 13. The two slanted contact surfaces 19a, 19b correspond with slanted surfaces 21a and 21b of the basic body 16. By pushing the two adjusting wedges 17a and 17b toward each other, the rear wall 13 will be displaced further forward toward the niche opening. The rear wall 13 will be moved back by pulling the two adjusting wedges 17a and 17b apart. A sufficiently large compensating space 15 can here, too, always be set by means of the adjusting wedges 17a and 17b.

FIG. 4 is a perspective top view onto the drip pan 8. The drip pan 8 is shaped like a tray with a floor area 24 and an encompassing wall 25. At a back end of the drip pan 8 the pressure-piece receptacle 23 is integrated in the floor area 24. The pressure-piece receptacle 23 has resilient detents 26 releasably retaining the pressure piece 22 (FIG. 3).

Figure 5:
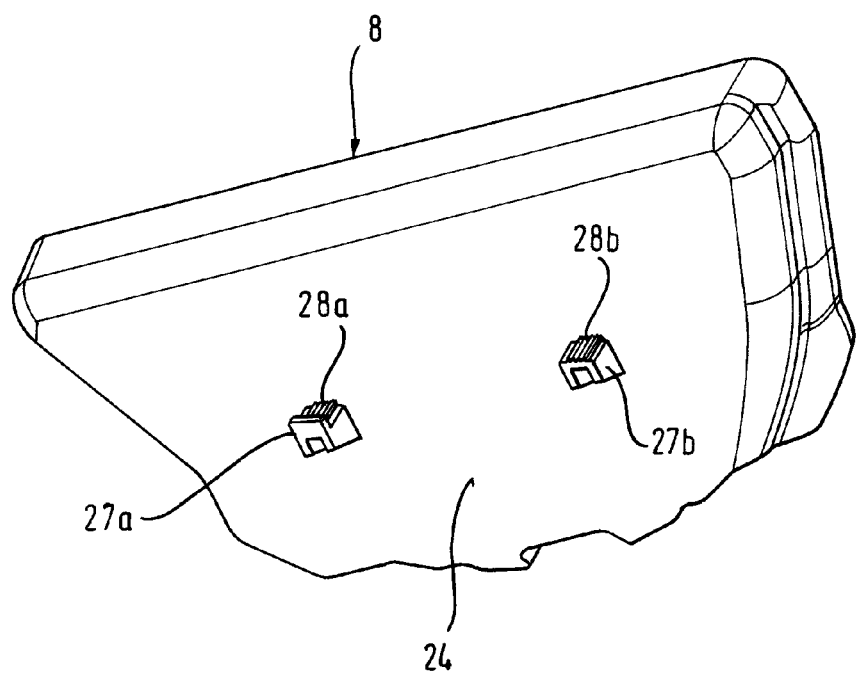
FIG. 5 is a perspective view from below onto the drip pan as shown in FIG. 4.

In FIG. 5 the drip pan 8 is shown in a perspective view from below. Provided on the underside of the floor area 24 are two supporting domes 27a and 27b. The supporting domes 27a and 27b can be molded onto the floor area 24 of the drip pan 8. The supporting domes 27a and 27b project perpendicularly from the plane of the floor area 24 and have laterally located ribbed surfaces 28a and 28b.

Figure 6:
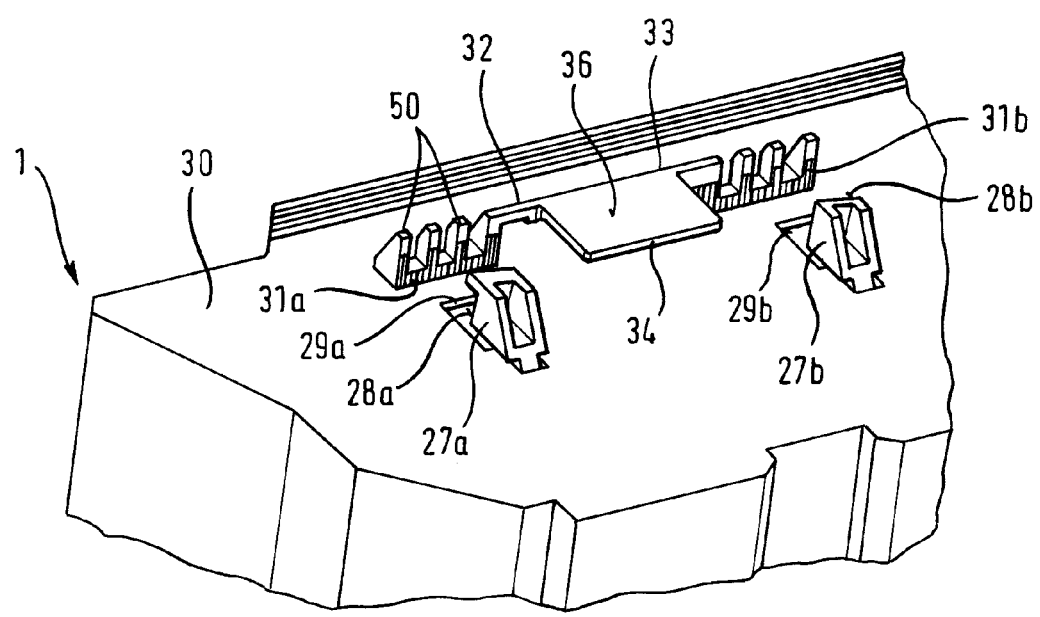
FIG. 6 is a perspective view from below onto a housing of the output unit having a mount for a tensioning wedge.
Figure 7:
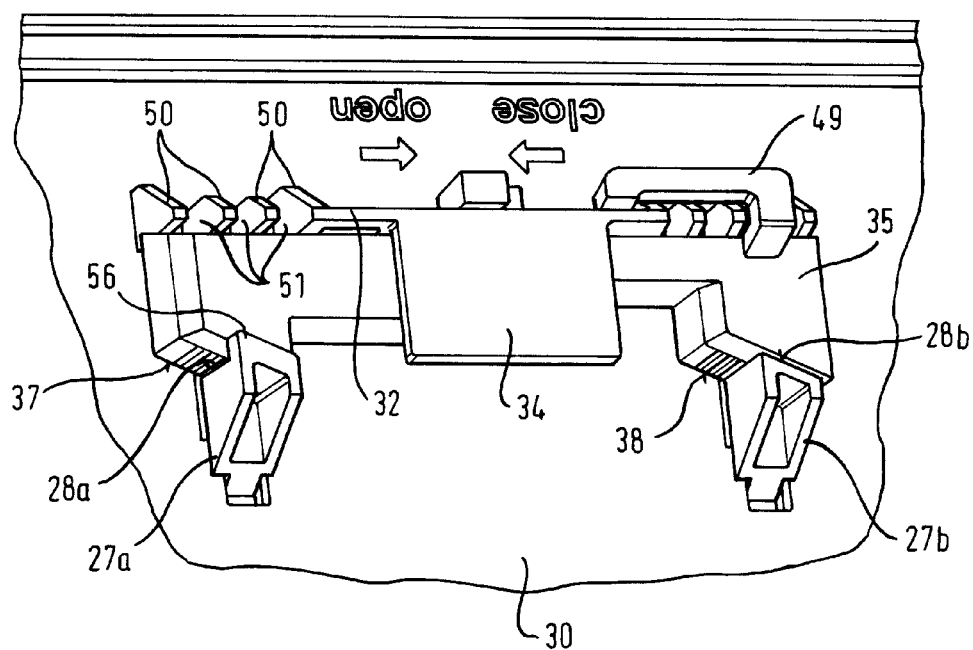
FIG. 7 is a perspective view from below onto the housing of the output unit as shown in FIG. 6 having a tensioning wedge inserted into the mount.

As shown in FIG. 6, the supporting domes 27a and 27b of the drip pan 8 project downwardly out through openings 29a and 29b in the floor 30 of the output unit 1 when the drip pan 8 is in position inserted into the output unit 1. Opposite the ribbed surfaces 28a and 28b, corresponding ribbed regions 31a and 31b are located on a supporting wall 32 on the floor 30 of the output unit 1. The supporting wall 32 is molded onto the floor 30 of the output unit 1. A guide plate 34 for a tensioning wedge 35 extends in a region between the two supporting domes 27a and 27b proceeding from a freely projecting end 33 of the supporting wall 32 (FIGS. 7 to 9). The guide plate 34 has a level blocking surface 36 extending in a plane parallel to the floor 30.

FIG. 7 shows the tensioning wedge 35 inserted into the mount as shown in FIG. 6 in a view from below onto the housing of the output unit. The tensioning wedge 35 is held on the floor 30 of the output unit 1 by means of the guide plate 34 and a guide projection 56 of the supporting dome 27*a*. The tensioning wedge 35 is therein displaceable, as indicated by the two arrows shown. In a position moved in FIG. 7 to the right, the tensioning wedge 35 is in an opened position (open), meaning that the two supporting domes 27*a* and 27*b* are not braced against the supporting wall 32. In a position moved in FIG. 7 to the left, the tensioning wedge 35 is, as shown, in a closed position (close), meaning that the two supporting domes 27*a* and 27*b* are braced against the supporting wall 32. In that braced position the drip pan 8 is pushed backward into the niche 4 by two tensioning-wedge surfaces 37 and 38 that are applied against correspondingly slanted ribbed surfaces 28*a* and 28*b* of the supporting domes 27*a* and 27*b* in order to pull the cover 9 against the rear wall 13.

The tensioning wedge 35 is shown by itself in FIG. 8 and FIG. 9. The tensioning wedge 35 consists substantially of a roughly rectangular basic body on one of whose narrow long sides 39 two projections 40 and 41 form a roughly C-shaped basic structure. The free end of the first projection 40 has a first incline 42 forming the tensioning-wedge surface 37. The tensioning-wedge surface 37 is provided with a first ribbed structure 43 corresponding to the ribbed surface 28*a* of the supporting dome 27*a*. The free end of the second projection 41 has a second incline 44 forming the tensioning-wedge surface 38. The tensioning-wedge surface 38 is provided with a second ribbed structure 45 corresponding to the ribbed surface 28*b* of the supporting dome 27*b*. A grip 47 is provided on a tensioning-wedge side 46 opposite the narrow long side 39. The grip 47 can have been molded onto the tensioning wedge 35 to form a single piece therewith. The grip 47 is embodied for being able to move the tensioning wedge 35 back and forth between its open and closed position. The grip 47 is embodied in the illustrated exemplary embodiment as a cube-shaped projection raised above a head side 48 of the tensioning wedge 35. A hook-shaped securing clamp 49 stands out on the head side 48 in the region of the second projection 41. The securing clamp 49 serves to fix the tensioning wedge 35 in position so that undesired releasing of the tensioning wedge 35 will be prevented. For fixing the tensioning wedge 35 in its closed position by means of releasable securing means such as screws, for instance, the supporting wall 32 is constructed from a plurality of single teeth 50 having spaces 51 for inserting releasable securing means. Assigned to the spaces 51, the tensioning wedge has a plurality of drilled holes 52 into which the releasable securing means can be inserted—in the case of screws, screwed—in order to fix the tensioning wedge 35 in position. At least one of the drilled holes 52 is provided with a further ribbed structure 53.

Figure 10:
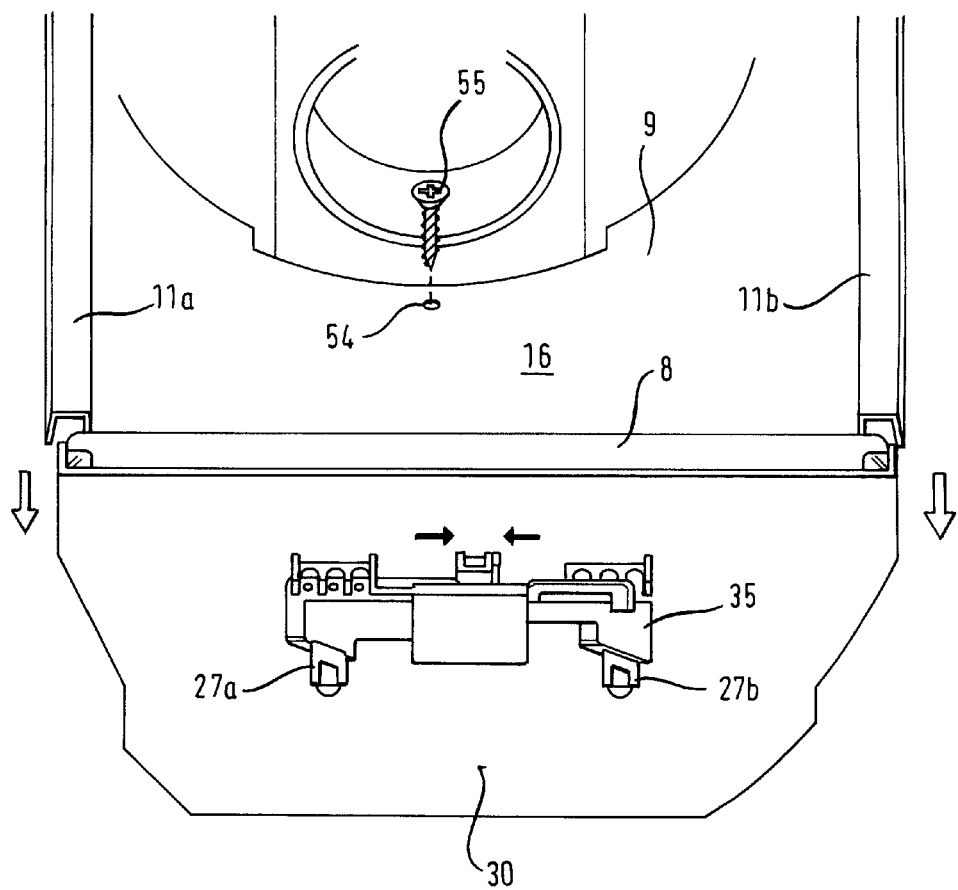
FIG. 10 is a perspective view from below onto the output unit having a niche and a tensioning wedge inserted into the mount.

FIG. 10 again shows, on a smaller scale, the mounting situation as illustrated in FIG. 7. In FIG. 10 the output unit 1 is shown with a niche 4 and a tensioning wedge 35 inserted into the mount. Through a movement displacing the tensioning wedge 35 to the left, the supporting domes 27*a* and 27*b* are moved downward and the drip pan 8 consequently pushed backward into the niche 4 in order to pull the cover 9 against the rear wall 13. The edge sections 11*a*, 11*b* of the cover 9 are therein pulled against the front supporting surfaces 12*a*, 12*b* of the niche frame 5. Provided in the cover 9 at a top end thereof in a central region of the dish-shaped section 10 is a drilled hole 54 via which the cover 9 can be pulled with its top end against the rear wall 13 of the niche 4 by means of a screw 55.

The invention claimed is:

1. A refrigeration device with an output unit, the refrigeration device comprising:
   a niche including a rear wall and a niche frame, the niche frame having front supporting surfaces; and
   a cover having a dish-shaped section curved inwardly into the niche when said cover is installed said cover bounded by edge sections, and each of said edge sections corresponding to one of said front supporting surfaces,
   wherein the edge sections of the cover are held in a final mounting position against corresponding ones of the front supporting surfaces of the niche frame,
   wherein the dish-shaped section is secured toward the rear wall of the niche by at least one releasable securing component such that the cover is elastically deformed to prevent gaps between the edge sections and front supporting surfaces.

2. The refrigeration device as claimed in claim 1, wherein the cover is detachable.

3. The refrigeration device as claimed in claim 1, wherein the cover is held at a distance from the rear wall of the niche by the at least one releasable securing means at a central region of the dish-shaped section of the cover.

4. The refrigeration device as claimed in claim 3, wherein a wall section of the rear wall is located proximal to the central region of the dish-shaped section of the cover when the cover is in the final mounting position, said wall section being depth-adjustable.

5. The refrigeration device as claimed in claim 4, wherein the wall section of the rear wall of the niche is depth-adjustable relative to a basic body of the output unit via adjusting wedges.

6. The refrigeration device as claimed in claim 1, wherein the at least one releasable securing component includes a screw to pull a top region of the cover toward the rear wall of the niche.

7. The refrigeration device as claimed in claim 1, wherein the at least one releasable securing component includes a pressure piece structured to push a lower portion of the cover toward the rear wall of the niche.

8. The refrigeration device as claimed in claim 7, further comprising a drip pan configured to receive the pressure piece, said drip pan being depth-adjustably mounted in the output unit to push the pressure piece against the cover.

9. The refrigeration device as claimed in claim 8, wherein the drip pan is structured to be depth adjusted within the niche by actuating a movably mounted tensioning wedge to push the pressure piece against the cover.

10. The refrigeration device as claimed in claim 1, wherein the cover is made from a metallic strip material.

11. A method for installing an output unit of a refrigeration device on a door, the method comprising:
   inserting a cover through an opening in the door until a curved section of the cover is positioned in front of a rear wall of a niche in the output unit in a final mounting position and such that edge sections of the cover are held against front supporting surfaces of a niche frame of the niche in the final mounting position;
   pulling a top region of the cover against the rear wall of the niche by tightening a releasable securing component;
   inserting a drip pan into the output unit; and
   bracing a tensioning wedge for adjusting a depth of the drip pan to push a bottom region of the cover toward the rear wall of the niche by a pressure piece held by the drip pan,
   wherein pulling the top region of the cover against the rear wall of the niche and pushing the bottom region of the cover toward the rear wall of the niche elastically deforms the cover in the final mounting position to prevent gaps between the edge sections and the front supporting surfaces.

12. A refrigeration device comprising:
an output unit comprising:
a body;
a niche including a rear wall and a niche frame, the niche frame having front supporting surfaces;
a cover including a dish-shaped section curved inwardly toward the rear wall of the niche when said cover is installed, said cover including edge sections, and each of said edge sections corresponding to one of said front supporting surfaces; and
at least one releasable securing device configured to secure the dish-shaped section toward the rear wall of the niche in an elastically deformed state such that the edge sections of the cover are held in a final mounting position against the front supporting surfaces of the niche frame without gaps between the edge sections and the front supporting surfaces.

13. The refrigeration device as claimed in claim 12, wherein the cover is detachable.

14. The refrigeration device as claimed in claim 12, wherein the cover is held at a distance from the rear wall of the niche by the at least one releasable securing means at a central region of the dish-shaped section of the cover.

15. The refrigeration device as claimed in claim 14, wherein a wall section of the rear wall is located proximal to the central region of the dish-shaped section of the cover when the cover is in the final mounting position, said wall section being depth-adjustable.

16. The refrigeration device as claimed in claim 15, wherein the wall section of the rear wall of the niche is depth-adjustable relative to a basic body of the output unit via adjusting wedges.

17. The refrigeration device as claimed in claim 12, wherein the at least one releasable securing component includes a screw to pull a top region of the cover toward the rear wall of the niche.

18. The refrigeration device as claimed in claim 12, wherein the at least one releasable securing component includes a pressure piece structured to push a lower portion of the cover toward the rear wall of the niche.

19. The refrigeration device as claimed in claim 18, further comprising a drip pan configured to receive the pressure piece, said drip pan being depth-adjustably mounted in the output unit to push the pressure piece against the cover.

20. The refrigeration device as claimed in claim 19, wherein the drip pan is structured to be depth adjusted within the niche by actuating a movably mounted tensioning wedge to push the pressure piece against the cover.

21. The refrigeration device as claimed in claim 12, wherein the cover is made from a metallic strip material.

22. The refrigeration device as claimed in claim 17, wherein said screw is visually concealed when the cover is in the final mounting position.

23. The refrigeration device as claimed in claim 19, wherein said pressure piece is visually concealed when the cover is in the final mounting position and a colander is installed on the drip pan.

24. The refrigeration device as claimed in claim 6, wherein said screw is visually concealed when the cover is in the final mounting position.

25. The refrigeration device as claimed in claim 8, wherein said pressure piece is visually concealed when the cover is in the final mounting position and a colander is installed on the drip pan.

26. The method as claimed in claim 11, wherein the cover is detachable.

27. The method as claimed in claim 11, wherein the cover is held at a distance from the rear wall of the niche when in the final mounting position.

28. The method as claimed in claim 27, further comprising adjusting a depth of a wall section of the rear wall located proximal to a central region of the curved section of the cover when the cover is in the final mounting position such that the cover is held at a distance from the rear wall of the niche.

29. The method as claimed in claim 28, wherein adjusting the depth of the wall section of the rear wall comprises moving adjusting wedges to adjust the depth of the wall section of the rear wall relative to a basic body of the output unit.

30. The method as claimed in claim 11, wherein the cover is made from a metallic strip material.

31. The method as claimed in claim 11, wherein said releasable securing component is visually concealed when the cover is in the final mounting position.

32. The method as claimed in claim 11, wherein said pressure piece is visually concealed when the cover is in the final mounting position and a colander is installed on the drip pan.

* * * * *